United States Patent [19]

Hirasawa et al.

[11] Patent Number: 4,683,543

[45] Date of Patent: Jul. 28, 1987

[54] TIME-BASED INTERPOLATION CONTROL OF A ROBOT

[75] Inventors: Kazushige Hirasawa, Kawanishi; Yasuhiro Shimizu, Nara; Takemasa Matsumura, Minoo, all of Japan

[73] Assignee: Matsushita Electrical Industrial Co. Ltd., Osaka, Japan

[21] Appl. No.: 629,623

[22] Filed: Jul. 11, 1984

[30] Foreign Application Priority Data

Jul. 14, 1983 [JP] Japan ................. 58-128607

[51] Int. Cl.$^4$ .............................. G05B 19/41
[52] U.S. Cl. .................. 364/513; 364/169; 364/723; 318/573
[58] Field of Search ............... 364/513, 169, 191–193, 364/723; 318/573

[56] References Cited

U.S. PATENT DOCUMENTS

| 3,920,972 | 11/1975 | Corwin, Jr. et al. | 364/513 |
| 3,943,343 | 3/1976 | Irie | 318/573 |
| 4,031,369 | 6/1977 | Heaman et al. | 364/169 |
| 4,528,632 | 7/1985 | Nio et al. | 364/169 |

FOREIGN PATENT DOCUMENTS 2393359 12/1978 France .

Primary Examiner—Jerry Smith
Assistant Examiner—John R. Lastova
Attorney, Agent, or Firm—Spencer & Frank

[57] ABSTRACT

A method of interpolatively controlling the movement of an arm portion of a robot along a line between predetermined first and second spatial positions which comprises teaching and playback steps. The teaching steps include inputting and storing in a teaching data storing memory the values of coordinates defining the first and second spatial positions, inputting and storing in the memory the predetermined velocity of the arm at the first spatial position, and determining from the coordinates and velocity stored in the memory the distance to be traversed by the arm between the first and second positions and the time required for this traversal. The playback steps include dividing the traverse time by a predetermined time unit to obtain a plurality of time-separated interpolation points and calculating sequentially incremental coordinate values for each of distance-separated points, corresponding to the time-separated points, from the stored coordinate values. The arm portion of the robot is then moved in accordance with the calculated incremental coordinate values.

4 Claims, 8 Drawing Figures

TIME-BASED INTERPOLATION CONTROL OF A ROBOT

BACKGROUND OF THE INVENTION

This invention relates to a method of interpolation control of a robot for use in arc welding or various assembling processes.

An object of this invention is to provide a method of interpolation control of a robot in which interpolation points are calculated at intervals of a unit time and the tip of the wrist or a arm portion of a robot body is allowed to move along the calculated points independently of the time required for the calculation of the interpolation points.

FIG. 1 shows the entire construction of a multijoint robot of teaching playback system having a control unit 1, a teaching box 2 and a robot body 3. the teaching box 2 and robot body 3 are connected to the control unit 1 through cables 4 and 5, respectively. In this type of robot, movement of a tip 6 of the wrist of the robot body 3 is important.

The movement of the tip 6 between teaching points will now be described. In FIG. 2, points A and B show teaching points. The coordinates of points A and B in the respective joint drive axis systems for the drive of the joints of the multijoint robot are represented by $A(M_{1A}, M_{2A} \ldots )$, and $B(M_{1B}, M_{2B} \ldots )$.

when the tip of wrist 6 is moved from point A to B with not interpolation control, the amounts of movement of respective joint drive portions within the time of movement $t_M$ are $|M_{1B}-M_{1A}|$, $M_{2B}-M_{2A}|$, ... Also, the locus l of the movement of the tip of the wrist of the robot body is normally part of a circular arc as shown in FIG. 2.

Next description is made of a method of interpolation control for directly moving the tip 6 of the wrist of the robot body 3 from point A to B. When an indefinite number of teaching points are provided on a straight line between points A and B as shown in FIG. 3, it enables the tip 6 to move in a substantially straight line between points A and B.

In this case, however, the teaching points are too many and thus the teaching operation becomes complicated and requires much time, resulting in impractical interpolation control.

Normally, calculated points are provided at regular distance intervals based on the coordinates of points A and B and processed to exist on the straight line connecting points A and B, and the tip 6 of the wrist of the robot body 3 is allowed to move along the calculated points.

This so-called linear interpolation control, by which the tip of the wrist 6 of the robot body 3 is moved in a straight line between points A and B.

With regard to the linear interpolation control between points A and B, there is a known method of calculating at each unit distance. That is, as shown in FIG. 4, the coordinates of points A and B in each joint drive axis system are converted to the coordinates of XYZ space, and the XYZ coordinates of point $N_1$ separated by a unit distance $\Delta d$ from the coordinates of point A and lying on the straight line between the points A and B are determined by the XYZ values of points A and B and reversely converted for each joint drive axis system. Then, the tip 6 of the wrist of the robot body 3 is moved while the real time calculation is being made.

It is now assumed that the time necessary to calculate the coordinates of point $N_1$ is $t_E$.

Thus, the tip 6 of the wrist of the robot body 3 cannot be moved toward point $N_1$ from point A at a speed higher than $\Delta d/t_E$.

The process of calculating for such a coordinate conversion actually involves a complicated calculation of the combination of trigonometric function, inverse trigonometric function, square root, multiplication, division, addition and subtraction, and therefore requires considerable time. If it is assumed that 100 ms is required for calculation of point $N_1$ and that the unit distance $\Delta d$ is 5 mm, the maximum speed at which the tip of the wrist 6 of the robot body 3 can move in real time is given by $$\Delta d/t_E = 5 \text{ mm}/100 \text{ ms}$$

$$= 3 \text{ m/min}.$$

In other words, the speed of the tip 6 is limited to the maximum speed, 3 m/min and thus at a speed above the maximum, the tip of wrist 6 of the robot body 3 stops bacause the calculation time is too much. Although the maximum speed is increased with the increase of unit distances $\Delta d$, the number of calculated points decreases to lower the precision of interpolation.

BRIEF DESCRIPTION OF THE DRAWING

The present invention will be apparent from the following detailed description taken in conjunction with the accompanying drawings, in which.

The method of interpolation control of this invention will be described with reference to FIGS. 5 and 6.

Figure 1:
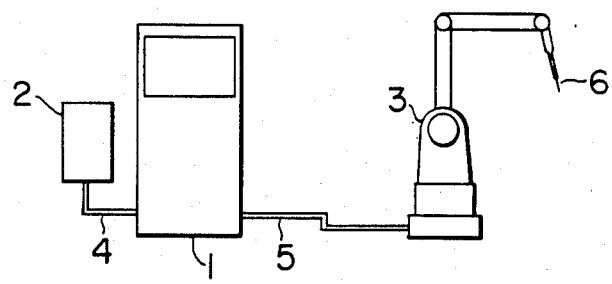
FIG. 1 is a front view of the multijoint robot.
Figure 2:
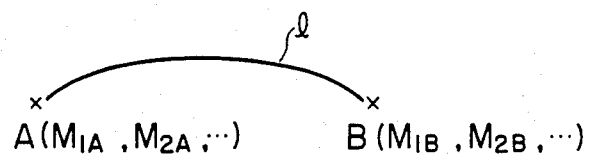
FIG. 2 is an explanatory diagram useful for explaining the movement of the tip of wrist of the robot body under no interpolation control.
Figure 3:
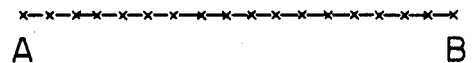
FIG. 3 is an explanatory diagram useful for explaining the straight movement in the case of multipoint teaching-points.
Figure 4:
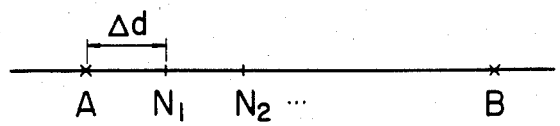
FIG. 4 is an explanatory diagram useful for explaining the conventional linear interpolation control.
Figure 5:
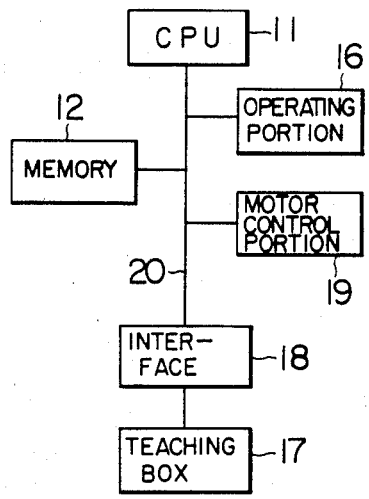
FIG. 5 is a block diagram of the control unit executing the method of interpolation control of this invention.
Figure 6:
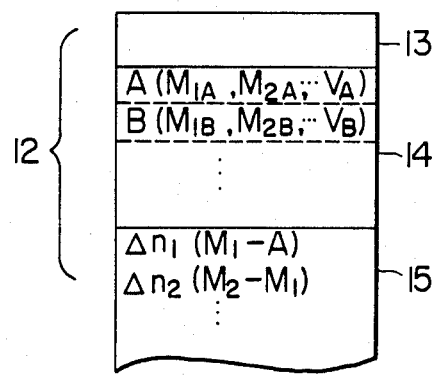
FIG. 6 is an explanatory diagram showing the memory.
Figure 7:
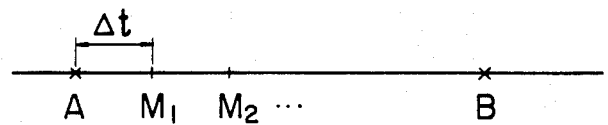
FIG. 7 is an explanatory diagram of the linear interpolation control.
Figure 8:
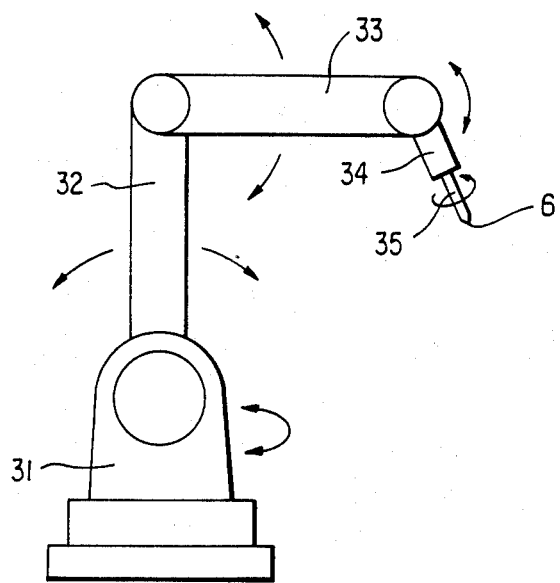
FIG. 8 is an enlarged view of the robot portion of FIG. 1.

FIG. 5 is a block diagram of the control unit. Reference numeral 11 presents a central processing unit (CPU) as a locus calculating portion; and 12 a memory having a system program storing portion 13, a teaching data storing portion or location 14 and a calculated data storing portion or location 15 for calculating the amount of movement of the tip of the wrist of the robot body on the basis of data of the teaching data storing portion or memory location 14 and temporarily storing it. The system program stored in advance in the memory 12 is executed to control the whole system. Reference numeral 16 represents an operating portion including a keyboard through which an operator can send various kinds of instructions to the CPU 11, and display elements for indicating operating and working conditions. Reference numeral 17 denotes a teaching box connected through an interface 18 to the CPU 11, 19 a motor control portion, and 20 a common bus for connecting the memory 12, the operating portion 16 and the motor control portion 19 to the CPU 11. FIG. 7 is an explanatory diagram for explaining the linear interpolation control corresponding to that in the conventional example of FIG. 4. FIG. 8 shows a more detailed view of the robot body shown in FIG. 1. In FIG. 8, 31 indicates a rotary mechanism, 32 the upper arm portion, 33 the front arm portion, 34 the wrist bending portion and 35 the wrist portion. The arm portions 31, 32, 33, 34 and 35 can be rotated in the respective directions shown by arrows in FIG. 8. The tip portion of the wrist 35 is the tip of wrist 6. In FIG. 7, points A and B show teaching points, of which the position data ($M_{1A}$, $M_{1B}$...), and velocity data ($V_A$, $V_B$...) are stored in the teaching data storing portion 14 of the memory 12. The distance, S of movement between the points A and B is determined from the position data of both points A and B, and the time of movement T between the points A and B is determined from the velocity data $V_A$ and the distance of movement S. Subsequently, the number of divisions, N is determined by dividing T by a predetermined unit time $\Delta t$ and one calculation unit is determined by dividing the distance of movement S between the teaching points A and B by the number of divisions, N. The calculated points $M_1$, $M_2$... are thus provided at intervals of one calculation unit from point A to B. In other words, $M_1$ and $M_2$ are pass points after each lapse of unit time $\Delta t$. The amounts of movement, $\Delta n1$, $\Delta n2$... from point A to point $M_1$, from point $M_1$ to point $M_2$,... each correspond to the amount that the tip of the wrist of the robot body is moved per unit time $\Delta t$. The amounts of movement are stored in the calculated-data storing portion 15 within the memory 12. The data within the calculated-data storing portion 15 are sequentially supplied to the motor control 19, thereby enabling the linear interpolation control. The calculation is performed by the CPU 11 in accordance with the system program within the memory 12. If high speed processing is required, high speed arithmetic elements can be used for the calculation. If, now, time $\Delta t'$ is necessary to obtain one of the calculated points $M_1$, $M_2$..., and the point $M_1$ is determined to satisfy the condition of the $\Delta t > \Delta t'$, the tip of the wrist of the robot body can be moved in real time at any velocity.

The actual movement of the robot in this case is as follows. First, the robot is started after the arithmetic processing or calculating operation is finished for the calculated point $M_1$. The time required for the robot to arrive at the calculated point $M_1$ is the unit time $\Delta t$. On the other hand, the time necessary for the calculation of point $M_2$ is $\Delta t'$ and $\Delta t'$ is smaller than $\Delta t$, or $\Delta t' < \Delta t$. Therefore, if the calculating operation of point $M_2$ is started just after the tip of the wrist of the robot body starts to move from the point A, the calculating operation of point $M_2$ has already been finished at the time point when the tip of the wrist of the robot body arrives at the calculated point $M_1$.

Consequently, the tip of the wrist of the robot body can be smoothly moved toward the calculated point $M_2$, not stopping at the point $M_1$. If the calculating operation of point $M_3$ is started immediately after the calculated point $M_2$ has been obtained the calculation processsing is always made ahead of the movement of the tip of the wrist of the robot body.

According to the embodiment, the calculated point is provided at every unit time $\Delta t$ and the value of unit time $\Delta t$ is determined to be larger than the calculation execution time $\Delta t'$, thereby enabling the tip of the wrist of the robot body to move smoothly at its maximum moving velocity being not dependent on the calculation execution time. In addition, the execution time $\Delta t'$ necessary for the calculated point to be obtained is normally about 50 to 300 ms and in the range in which the condition of $\Delta t > \Delta t'$ is satisfied, the unit time $\Delta t$ of 50 to 500 ms is preferable. If the unit time $\Delta t$ is too large, the distance between the calculated points becomes large, thus the accuracy of interpolation becomes lower. In usual applicants, the interpolation precision is particularly important when the robot body moves at a low velocity, and it is not required to be high when the robot body moves at a high speed. In this embodiment, the calculated points are determined on the basis of the unit time thus, the interpolation precision, is increased as the velocity of movement is decreased.

While in this embodiment only the linear interpolation control is described, this invention can be similarly applied to circular arc interpolation control.

According to this invention, the interpolation points provided at intervals of a unit time are calculated out and the tip of the robot body is moved along the calculated points. Thus as compared to the conventional method of interpolation control in which the maximum velocity of the robot is controlled or limited by the time necessary for obtaining each of the calculated points, the method of this invention permits the tip of the wrist of the robot body to move without dependence on such a calculation time necessary for each of the calculated points, thus requiring no particular device for reducing the calculation time.

We claim:

1. A method of interpolatively controlling the movement of an arm portion of a robot along a locus between predetermined first and second spatial positions, said arm being movable at predetermined velocities, comprising (1) teaching steps including
(a) inputting and storing in a teaching data storing memory the values of coordinates defining said first and second spatial positions;
(b) inputting and storing in said teaching data storing memory the predetermined velocity of said arm at said first spatial position;
(c) determining from the coordinates stored in said memory in step (1)(a) the distance to be traversed by said arm between said first and second spatial positions, said distance being stored in said memory; and
(d) determining from the predetermined velocity stored in step (1)(b) and the distance stored in step (1)(c) the traversal time required for said arm to move from said first spatial position to said second spatial position, said traversal time being stored in said memory; and (2) playback steps for calculating in a locus calculating processing unit interpolated distances through which the arm portion of said robot is to be moved based on the teaching data stored in said memory in step (1), said playback steps including
(a) dividing the traversal time obtained in step (1)(d) by a predetermined unit time to obtain a plurality of time-separated interpolation points, said time-separated interpolation points corresponding to distance-separated points along said locus having a unit distance therebetween; and (b) calculating sequentially incremental coordinate values for each of said distance-separated points from the stored coordinate values obtained in step (1)(a); and (3) moving the arm portion of said robot in accordance with the incremental coordinate values calculated in step (2)(b).

2. A method according to claim 1 wherein the time required to calculate each of said incremental coordinate values in step (2)(b) is less than the time referred in step (3) for the arm portion of said robot to move from one distance-separated point to the next.

3. A method of interpolatively controlling the movement of an arm portion of a robot along a locus defined by spatial coordinate values, said arm being movable at predetermined velocities, comprising the steps of:

storing data defining the start and end points of said locus and the velocity of said arm portion at said start point, said data being stored in a teaching data storing memory location;

calculating in a central processing unit a spatial distance given as the amount of movement of said arm portion along said locus between said start and end points and the time elapsing during said movement, said spatial distance and said elapsed time being determined from the data stored in said teaching data storing memory location;

dividing said elapsed time by a predetermined time period $\Delta T$ to obtain a quotient constant N;

dividing said distance between said start and end points by N to determine time-based interpolation points with a unit distance therebetween along said locus;

calculating sequentially in said central processing unit from said unit distance and said stored data coordinate values of said time-based interpolation points;

temporarily storing said calculated coordinate values of each interpolation point in a calculated data storing memory location; and controlling movement of the arm portion of said robot by a motor control unit in accordance with said stored calculated coordinated values.

4. A method according to claim 3 wherein the time required to calculate and store the calculated coordinate values of each interpolation point is less than the time required for the arm portion of said robot to move through said unit distance.

* * * * *